US006315361B1

(12) United States Patent
Stone et al.

(10) Patent No.: US 6,315,361 B1
(45) Date of Patent: Nov. 13, 2001

(54) SEAT ADJUSTMENT AND DUMPING SYSTEM WITH MEMORY

(75) Inventors: Joseph Mark Stone, Fishers; Donald T. Heckel, Jr., Westfield, both of IN (US)

(73) Assignee: Porter Engineered Systems., Westfield, IN (US)

( * ) Notice: Subject to any disclaimer, the term of this patent is extended or adjusted under 35 U.S.C. 154(b) by 0 days.

(21) Appl. No.: 09/556,251

(22) Filed: Apr. 24, 2000

(51) Int. Cl.$^7$ ................................. B60N 2/20; B60N 2/22
(52) U.S. Cl. ................ 297/362.12; 297/375; 297/378.12
(58) Field of Search ........................... 297/361.1, 362.12, 297/362.14, 375, 378.12

(56) References Cited

U.S. PATENT DOCUMENTS

| | | |
|---|---|---|
| 3,580,635 | 5/1971 | Posh . |
| 3,727,978 | 4/1973 | Barriere et al. . |
| 3,887,232 | 6/1975 | Dinkel . |
| 4,103,964 | 8/1978 | Klingehofer et al. . |
| 4,169,626 | 10/1979 | Hollar, Jr. . |
| 4,218,091 | 8/1980 | Webster . |
| 4,269,446 | 5/1981 | Gersmann et al. . |
| 4,634,182 | 1/1987 | Tanaka . |
| 4,685,736 | 8/1987 | Tanaka et al. . |
| 5,217,195 | 6/1993 | Tanaka et al. . |
| 5,219,045 | 6/1993 | Porter et al. . |
| 5,441,129 | 8/1995 | Porter et al. . |
| 5,482,349 | 1/1996 | Richter et al. . |
| 5,547,255 | 8/1996 | Ito et al. . |
| 5,568,843 | 10/1996 | Porter et al. . |
| 5,660,440 | * 8/1997 | Pejathaya ........................ 297/362.12 |
| 5,706,705 | 1/1998 | Stringer . |
| 5,718,482 | * 2/1998 | Robinson .................... 297/362.12 X |
| 5,755,493 | 5/1998 | Kodaverdian . |
| 5,794,470 | 8/1998 | Stringer . |

(List continued on next page.)

Primary Examiner—Peter R. Brown
(74) Attorney, Agent, or Firm—Baker & Daniels

(57) ABSTRACT

A system for adjusting and dumping the position of a seat, such as a vehicle passenger or driver's seat, utilizes simultaneously translating master and slave adjustment rods to pivot the seat back frame about a pivot point. Each adjustment rod is locked in a passenger pre-set position by a corresponding locking mechanism. This preset position is "remembered" by way of a marker selectively engaged to the master adjustment rod, and is restored when the marker resides within a marker dock affixed to the locking mechanism. A user adjustment input is operable to release the two locking mechanisms and the marker from the corresponding rods so that the rods can freely translate as the passenger adjusts the angle of inclination of the seat back. When the adjustment input is released, the locking mechanisms and marker re-engage to provide the memory function for the system. A passenger operated dump input is operable to release only the locking mechanisms, but not the marker so that the pre-set angle is remembered. The system contemplates a dual output from the user-operated adjustment input, one output activating the marker and the other fed as a first input to a transfer mechanism. A second input to the transfer mechanism is from the passenger-operated dump input. The transfer mechanism includes a pivoting lever that is connected to the first and second inputs and to two outputs, one connected to the master locking mechanism and the other connected to the slave locking mechanism. Activation of either of the two inputs actuates both outputs to release the corresponding locking mechanisms, allowing translation of the corresponding adjustment rods. The transfer mechanism has a stop feature that holds the pivoting lever in its activated state during the entirety of the dump cycle. The stop feature is activated through a reset gear and rack based on the movement of the marker with the master adjustment rod.

28 Claims, 10 Drawing Sheets

U.S. PATENT DOCUMENTS

| | | |
|---|---|---|
| 5,806,932 | 9/1998 | Zhuang . |
| 5,819,881 | 10/1998 | Stringer . |
| 5,823,622 * | 10/1998 | Fisher, IV et al. .............. 297/362.12 |
| 5,887,949 | 3/1999 | Kodaverdian . |
| 5,918,939 * | 7/1999 | Magadanz ........................ 297/375 X |
| 5,947,560 * | 9/1999 | Chen ................................ 297/362.12 |
| 6,017,090 * | 1/2000 | Bonk ................................ 297/362.12 |

* cited by examiner

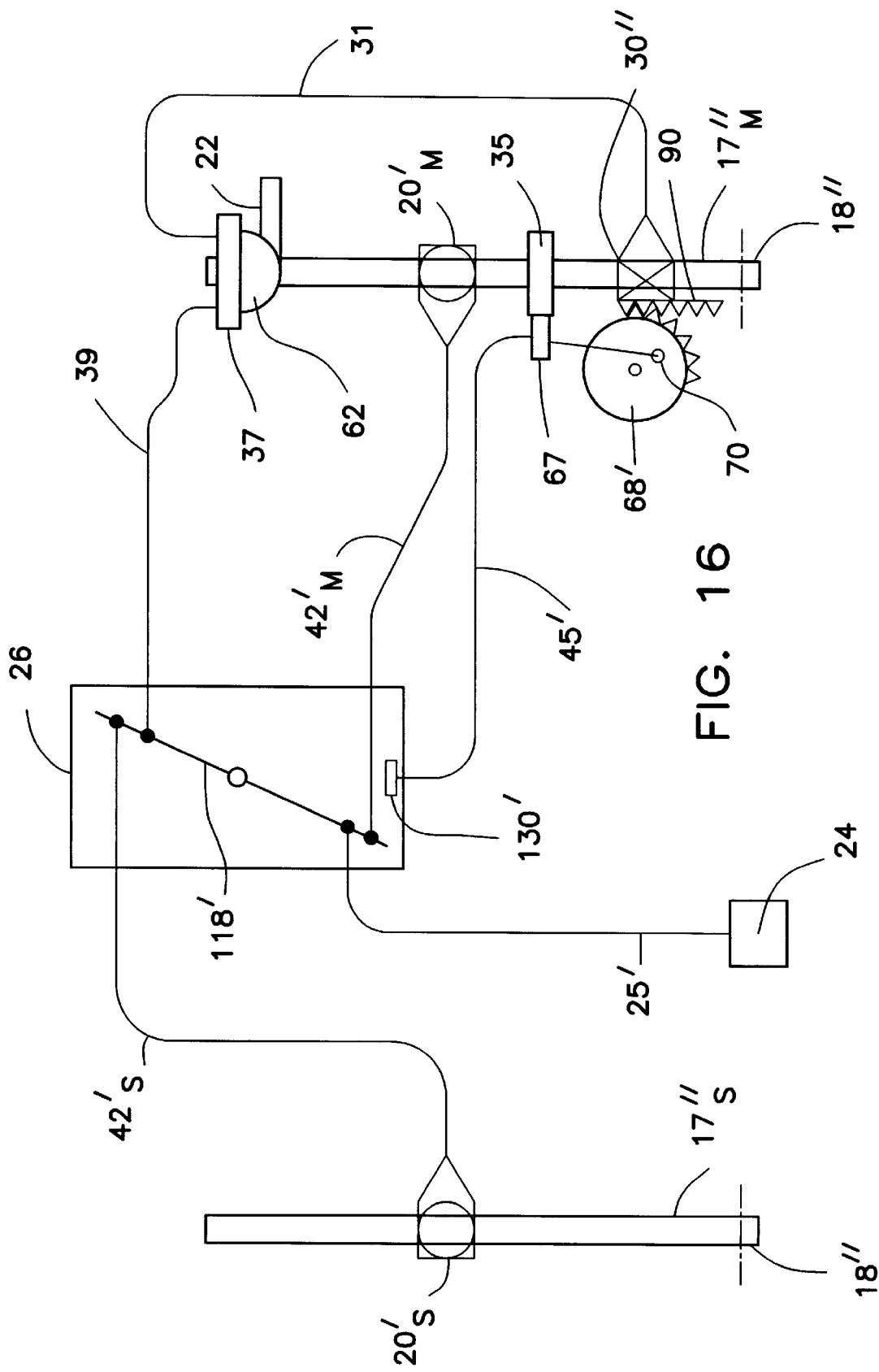

SEAT ADJUSTMENT AND DUMPING SYSTEM WITH MEMORY

BACKGROUND OF THE INVENTION

The present invention relates to a seat recline and dumping system that includes a memory feature. More particularly, the system of the invention is capable of adjustment to a particular angle, dumping the seat back away from that angle, and then returning to the preset angular orientation.

In most modern vehicles, the seat backs of the passenger seats, particularly the front seats, are adjustable. By the simple expedient of a hand lever, a passenger can adjust the angle of incline of the seat back to suit the person's comfort level. In many vehicles, the seat back can be adjusted from a substantially vertical orientation to a nearly horizontal position to allow the passenger to recline.

When passengers enter the rear seat of a two-door vehicle, it becomes necessary to pivot the seat back of the front seat forward to allow access to the rear of the vehicle. This process is known as "dumping" the front seat. In some reclining seat designs, the dumping process occurs by manipulating the same lever that is used to adjust the angular orientation of the seat back. This approach is simple, but it does not allow the vehicle passenger to restore the passenger seat back to a preset angle.

This process is shown schematically in FIGS. 1(a)-(c). Specifically, a seat S is connected to the vehicle body by way of a frame F. The seat back B can be adjusted in either direction as indicated by the dual arrows R. As shown in FIG. 1(b), the passenger can adjust the seat back to a preferred angle A of inclination. However, when a passenger desires access to the rear of the vehicle, the seat back must be dumped from its pre-set angular position. This dumping phenomenon occurs by pivoting the seat forward in the direction of the arrow P.

In the case of the simpler seat adjustment mechanism, using the recline adjustment to dump the seat does not allow the passenger to automatically return the seat back to the predetermined angle A. As a result, more sophisticated systems have been developed that separate the seat recline feature from the dumping feature. These devices separate dumping from the normal adjustments of the seat back so that the seat back does not lose its predetermined angle of inclination A.

One such patent is owned by the assignee of the present invention, namely, U.S. Pat. No. 5,806,932. The '932 patent relies upon a memory latch to establish the angle of inclination A of the seat back. The memory latch is allowed to pivot when the seat is operated in its dump mode. When the dumping has been completed, the latch is restored to its locked position to thereby re-establish the seat back at its user set angle A. While the system of the '932 patent provides significant benefits over the prior adjustment mechanisms, there remains a need for improvements to seat adjustment and dumping mechanisms. For instance, most prior adjustment and dumping mechanisms rely upon relatively bulky stamped metal components that can be expensive and difficult to assemble. There remains a need for a recline and dumping system that is lightweight, that fits into as small an envelope as possible, and that is inexpensive to manufacture.

SUMMARY OF THE INVENTION

In order to address these needs, the present invention contemplates a seat adjustment and dumping system having a memory feature. In one embodiment, the seat adjustment is accomplished by a pair of adjustment rods (master and slave) engaged to opposite sides of the seat frame. Axial translation of the rods causes the seat back to pivot relative to the fixed seat frame. The axial position of each rod can be simultaneously fixed by corresponding master and slave locking mechanisms mounted to the fixed support frame. The master locking mechanism can include a user-operated adjustment input that can be rotated to selectively open or close the locking mechanisms.

The system also includes a marker slidably mounted on the master adjustment rod that itself includes a selectively activatable locking mechanism. When the locking mechanism is engaged, the marker moves or translates with the master adjustment rod. Movement of the marker is limited by a marker dock attached to the locking mechanism, which thereby stops movement of the adjustment rod at a "memory" position corresponding to the passenger selected angle of inclination of the seat back. When the marker is released, the master adjustment rod translates freely through the marker while the marker remains held within the marker dock. In this way, the user can generate a new memory position once the marker is re-engaged to the rod.

In one embodiment of the invention, the rod locking mechanisms and the marker locking mechanism are simultaneously controlled by operation of the adjustment input. Preferably, the adjustment input includes a pivoting lever carrying a cable spool at one end. A cable winds around the spool and through a cable block mounted on the master locking mechanism. One portion or side of the cable is a marker cable engaged to the marker and operable to release or engage the marker from the master adjustment rod. The opposite side of the cable is provided as a first input to a transfer mechanism that constitutes another feature of the invention.

The transfer mechanism includes a pivoting lever that is connected at one end to the first input originating from the adjustment input. The lever is further connected, preferably at its opposite ends, to a master output and a slave output. These outputs are fed to a corresponding locking mechanism for the master and slave adjustment rods. In operation, activation of the first input (following user-activation of the adjustment input) causes the lever to pivot, which simultaneously places the master and slave outputs in tension. This tension is translated to the corresponding locking mechanisms to release the mechanisms from the rods to permit adjustment of the seat back angle.

The transfer mechanism also receives a second input from a user-operated dump input. The dump input can be activated to allow the seat back to be pivoted forward to allow access to the back seat of a vehicle. The second input is connected to the lever at the opposite end of the lever from the first input. In this way, activation of the dump input and second input to the transfer mechanism causes the lever to operate in the same manner as if the activation input is operated. Thus, with either input (adjustment or dump), the two outputs from the transfer mechanism are activated to release the master and slave locking mechanisms.

In one feature of the invention, the marker is isolated from the dumping function so that the system can "remember" the passenger-selected seat back angle. This isolation is accomplished by linking the marker directly to only the adjustment input, rather than to the transfer mechanism. However, in another aspect of the invention, the marker plays an integral role in the dump cycle for the system. In particular, the marker operates a cam-type reset mechanism that restricts de-activation of the transfer mechanism when the marker is outside its memory position—i.e., not positioned within the marker dock. In one embodiment, this reset function is fulfilled by a rack attached to the marker that translates with the marker as it moves with the master adjustment rod. The rack gear selectively engages a reset gear to cause the gear to rotate from a neutral position in a preferably clockwise direction a pre-determined partial turn.

The reset gear is connected to a reset cable by an eccentrically mounted eye fitting. As the gear rotates, so too does the eye fitting, which places the reset cable in tension. in accordance with one embodiment of the invention, the reset cable is linked to the transfer mechanism and is operable to move a stop into position within the mechanism to prevent return movement of the lever. According to one aspect of the invention, when the dump input is activated, the input to the transfer mechanism releases the locking mechanisms so the adjustment rods can freely translate and the seat back freely pivot. The passenger can then fold the seat back forward, causing the adjustment rods to translate relative to the locking mechanisms. Since the marker has not been disengaged by activation of the dump input, it also translates relative to the master locking mechanism.

As the marker translates, the rack traverses relative to the reset gear causing the gear to rotate. Rotation of the reset gear places the reset cable in tension, which then activates the stop within the transfer mechanism. When the stop is activated, the lever, which has been moved to its activated position by operation of the dump input, is prevented from returning to its neutral position. (Note that when the lever is in its neutral position, the locking mechanisms are engaged to the adjustment rods). At the peak of the cycle, the seat back is folded down across the seat, the adjustment rods are at the rear limit of their travel, and the marker is dislodged from the marker dock and clear of the reset gear.

As the passenger pivots the seat back upward, back toward its initial pre-set angle of inclination, the adjustment rods travel forward, carrying the marker with them. As the marker moves towards the marker dock, the rack re-engages the reset gear, causing the gear to rotate in the opposite direction (counter-clockwise) back toward its own neutral position. As the gear rotates, tension on the reset cable is relieved until eventually the cable no longer activates the stop within the transfer mechanism. As this point, the lever is free to return to its neutral position, at which point the master and slave outputs return to their free states and the locking mechanisms re-engage their respective adjustment rods. Thus, the reset mechanism prevents premature engagement of the adjustment rods during the dumping cycle, even if the dump input has been released.

It is one object of the present invention to provide a seat back adjustment and dumping system that incorporates a memory function. It is a further important objective to provide such a memory function that is isolated from the dumping function of the system.

Another object of the invention is accomplished by features that prevent inadvertent locking of the adjustment rods during the dump cycle. One benefit of the system of the present invention is that the adjustment, dumping and memory features can be realized with a minimal number of components, presented in a compact envelope.

Another benefit is that many of the components of the system can be fabricated from lighter-weight and cheaper materials than prior metal devices. Other objects and specific benefits of the invention can be discerned upon consideration of the following written description together with the accompanying figures.

DESCRIPTION OF THE FIGURES

FIG. 16 is a schematic representation similar to the representation of FIG. 13, showing a second stage of the dumping cycle after the seat back has been dumped.

DESCRIPTION OF THE PREFERRED EMBODIMENTS

Figure 1:
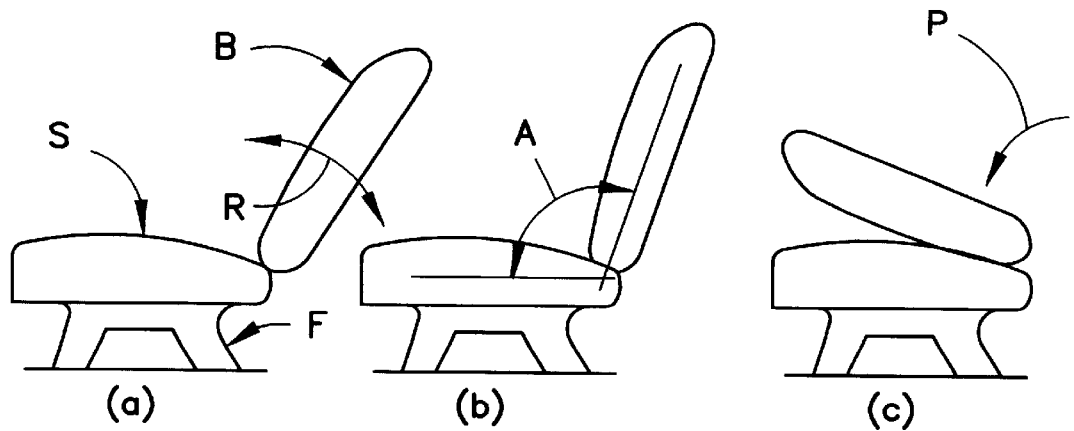
FIGS. 1(a)–(c) are schematic representation of various positions of an adjustable vehicle seat back.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
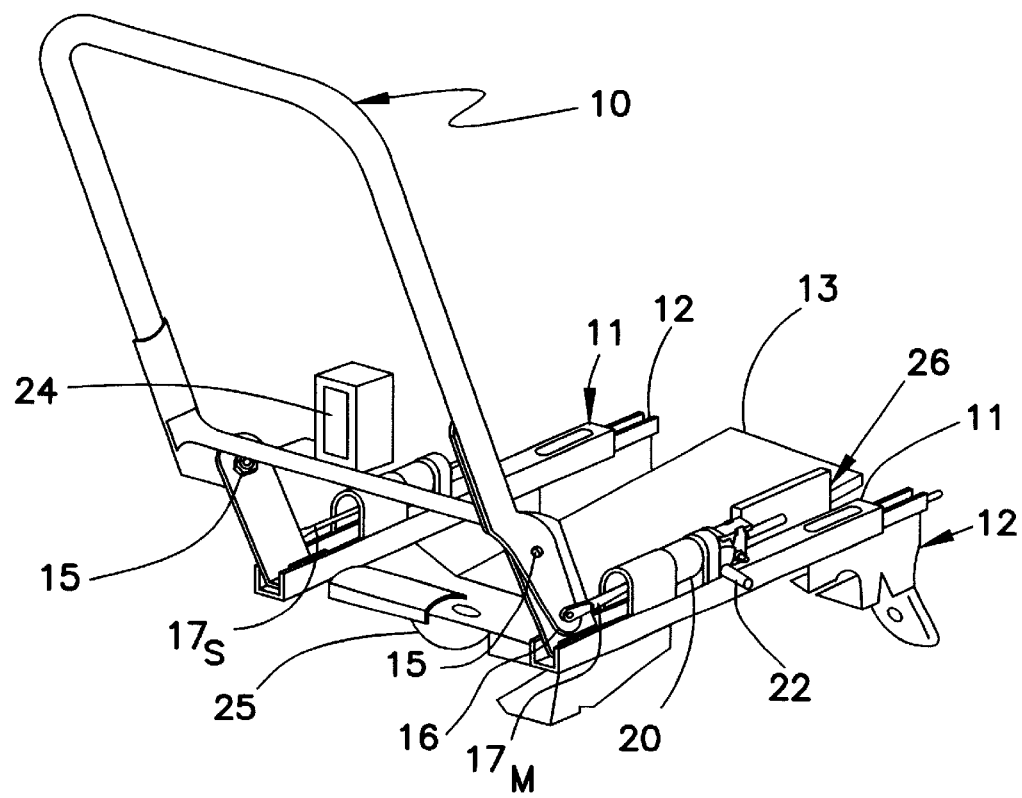
FIG. 2 is a perspective view of a seat adjustment and dumping system according to one embodiment of the invention, as mounted between a seat back frame and a seat mounting frame.

As depicted in the diagram of FIG. 1, a seat S includes a pivotable back B. The seat is mounted to the vehicle by way of a frame F. As shown in FIG. 2, the seat back includes a seat back frame 10 that follows the general contours of the seat back. The frame F can include a seat carriage 11 that is slidably mounted on a pair of support rails 12 affixed to the vehicle body. The seat carriage 11 is mounted to the rail 12 so that the entire seat can be linearly adjusted backward and forward to provide leg room for the passenger. The seat frame can also include a seat pan section 13 that is disposed within the base of the seat.

The seat back frame 10 is fastened to the seat carriage 11 by a pair of frame pivots 15. The frame pivots 15 are configured to allow the seat back frame to rotate backward, as depicted in FIG. 1(a), for adjustment of the angle A of inclination of the seat back, or to pivot forward as depicted in FIG. 1(c). In a typical case, the pivoting forward, or dumping, of the seat back is physically limited by the cushion material of the seat S, while the maximum backward rotational adjustment is limited by contact with the rear seat of the vehicle. In some instances, the frame pivot 15 can be configured to allow the seat back B to lie essentially flat across the lower portion of the seat, to thereby provide a substantially horizontal support surface. It is understood that the configuration of the seat S, namely its frame and pivot components, can be modified to fit a variety of applications, the details of which need not be specific to the present invention.

Figure 3:
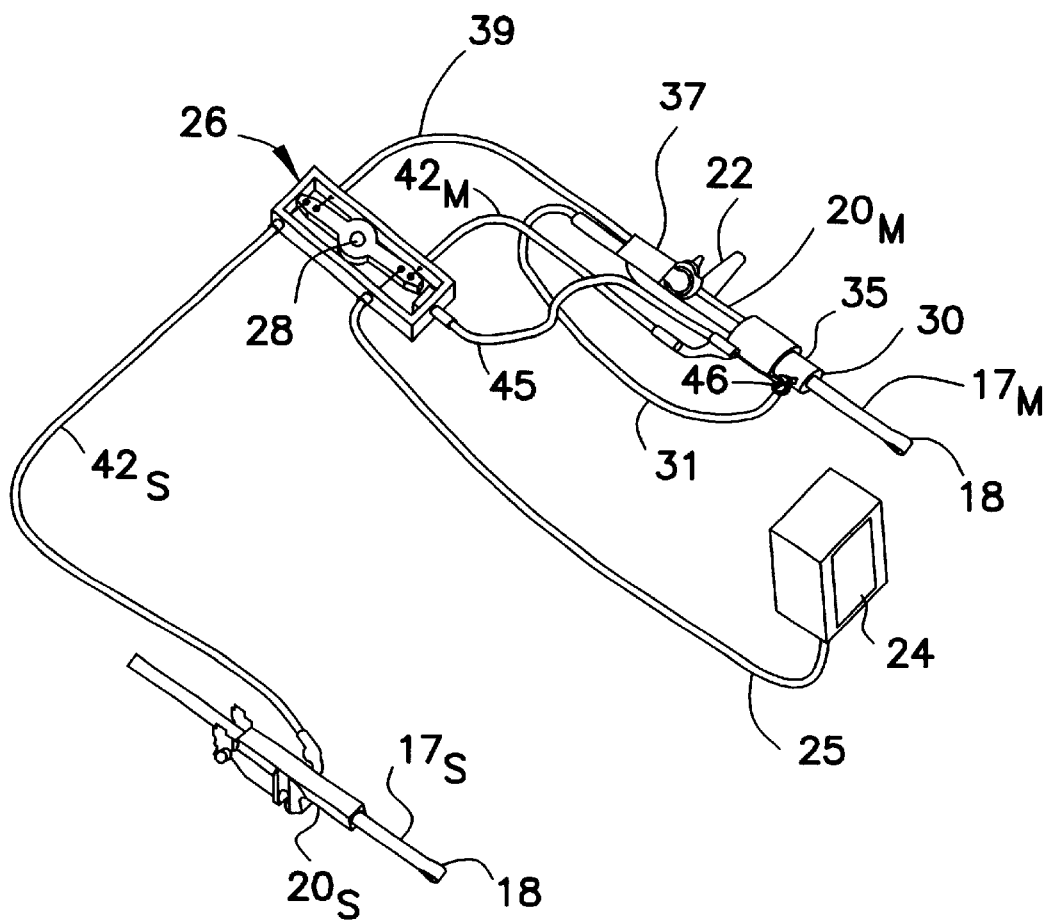
FIG. 3 is top perspective view of the seat adjustment and dumping system according to one embodiment of the present invention.

In accordance with the present invention, the angular attitude of the seat back frame 10 is adjusted by the linear stroke of a pair of adjustment rods $17_M$ and $17_S$ (see FIG. 3). Each adjustment rod is connected to a lower leg portion 16 of the back frame 10 below the location of the frame pivot 15. Thus, as the adjustment rods are simultaneously translated forward or backward, they generate a moment through the lower leg portions 16 to rotate or pivot the back frame 10. As shown in more detail in FIG. 4, each adjustment rod $17_S$ and $17_M$ includes an enlarged mounting head 18 at one end which defines a hole 18a there through. The mounting head 18 can be engaged to the lower leg portion 16 of the back frame by way of a pivot bolt or rivet connection.

Referring now to FIG. 3, the general components of the seat adjustment and dumping system of the present invention are depicted. The system includes a master and a slave portion, each being designated by the respective subscripts M and S. As explained above, each side of the seat includes an adjustment rod $17_M$ and $17_S$. Each adjustment rod further carries a locking mechanism $20_M$ and $20_S$. Each locking mechanism is mounted to the seat carriage 11 and provides a device for fixing the axial location of each adjustment rod relative to the seat carriage. When each locking mechanism $20_M$ and $20_S$ is activated, the corresponding adjustment rod is locked against translation. This feature is used to fix the location of the seat back at the angle of inclination A (see FIG. 1(b)).

In the preferred embodiment, the slave adjustment rod $17_S$ carries a return spring 19 that is housed within a sheath 19a. The return spring provides a force against the mounting head 18 of the adjustment $17_S$ to push the mounting head outward relative to the locking mechanism $20_S$. In the context of the present invention, this return spring 19 biases the adjustment rod to the rear of the seat, which thus biases the seat back to a forward pivoting orientation. Nominally, however, the return spring 19 provides a return function from the reclined position of the seat back B, and assists in the dumping function. The return spring also provides some resistance as the passenger adjusts the angle A of inclination of the seat back.

The seat adjustment system of the invention includes a recline or adjustment input 22 that is associated with the master adjustment rod $17_M$. The recline input is preferably manually operated by the passenger to release the locking mechanisms $20_M$ and $20_S$. When these locking mechanisms are released, both adjustment rods $17_M$ and $17_S$ are free to translate relative to the locking mechanisms, and therefore relative to the seat carriage 11. This free translation thus allows the passenger to adjust the angle of the seat back frame 10.

A second passenger input is the dump input 24. Preferably, this dump input is situated at the rear face of the seat back B. With this orientation, the dump input 24 is readily accessible to a rear seat passenger. In addition, the passenger can activate the dump cable 25 while simultaneously pushing the seat back B forward.

The seat adjustment and dumping system of present invention is most preferably cable actuated. Thus, an actuator cable $42_M$ is connected to the master locking mechanism $20_M$, while a corresponding combination is provided for the slave unit as cable $42_S$ and mechanism $20_S$. In accordance with the preferred embodiment of the invention, activation of the recline input 22 simultaneously actuates the master slave locking mechanisms $20_M$ and $20_S$. However, in one feature of the invention, neither actuator cable $42_M$ or $42_S$ is directly connected to the recline input 22. Instead, these cables are fed through a transfer mechanism 26. In addition, the recline input 22 provides a first output 39 which is directly input to the transfer mechanism 26. As will be explained in more detail herein, activation of the recline input 22 actuates the first output 39, which then causes activation of the two actuator cables $42_M$, $42_S$ and their corresponding locking mechanisms $20_M$ and $20_S$.

Similarly, the dump input 24 is connected by way of a cable 25 to the transfer mechanism 26. Activation of the dump input strokes the dump cable 25 which ultimately causes actuation of the two locking mechanisms $20_M$ and $20_S$. Releasing the two locking mechanisms $20_S$ and $20_M$ allows each of the adjustment rods $17_M$, $17_S$ to translate axially, resulting in a rotation or pivoting of the seat back frame 10. The locking mechanisms $20_M$ and $20_S$ preferably permit infinite adjustment of the axial position of the adjustment rods, and therefore infinite numbers of angles A of the seat back B relative to the base of the seat.

In another feature of the invention, a memory is provided that allows the seat back to return to its user adjusted angle A after the seat back has been dumped (see FIG. 1(c)). Thus, the present inventions contemplates a marker 30 that is selectively engaged to the master adjustment rod $17_M$. A marker dock 35 is attached to the master locking mechanism $20_M$ to provide a stopping point for the marker 30. Again as will be explained in more detail herein, when the marker 30 is clamped to the adjustment rod $17_M$, it moves as the rod translates. When the marker 30 reaches the dock 35, the movement of the adjustment rod $17_M$ is stopped so that the seat back is oriented at the preset angle A.

Alternatively, the marker 30 can be released or deactivated so that the adjustment rod $17_M$ is free to translate relative to the marker—i.e. the marker does not move with the rod. In this configuration, the passenger can completely adjust the angle of recline of the seat back. Once the passenger has released the recline input 22, the marker 30 again clamps onto the adjustment rod $17_M$ to establish the memory feature of the mechanism.

As with the locking mechanisms for the master and slave rods, the marker 30 has its own locking mechanisms. This locking mechanism is actuated or released based upon the state or condition of the recline input 22. Thus, the marker 30 is connected to the recline input 22 by way of a marker cable 31, or a second output of the recline input.

In a further feature of the seat adjustment and dumping system of the present invention, a reset mechanism 46 is provided. The reset mechanism is activated in response to movement of the marker 30. This reset mechanism insures that the locking mechanisms $20_M$ and $20_S$ are not activated in the middle of a dumping cycle. In other words, the reset mechanism 46 keeps the locking mechanisms open, which allows the adjustment rods $17_M$ and $17_S$ to freely translate as the seat back B is pivoted forward to the position shown in FIG. 1(c), and then returned to its memory position as depicted in FIG. 1(b). It can of course be understood that if the master and/or slave locking mechanisms engage about the adjustment rods in the middle of the dump cycle, the seat back B would be restricted from further pivoting. Moreover, such a response would establish a new seat back angle A memory position, which is not necessarily acceptable to the passenger.

Thus, in accordance with one aspect of the invention, the reset mechanism 46 is connected to the transfer mechanism 26 by way of a reset cable 45. Activation of the reset mechanism 46 holds the transfer mechanism in a state in which the master and slave actuator cables $42_M$ and $42_S$ are actuated thereby releasing or opening the two locking mechanisms $20_M$, $20_S$. Again, further details of the operation of the reset mechanism 46 will be provided herein.

Figure 4:
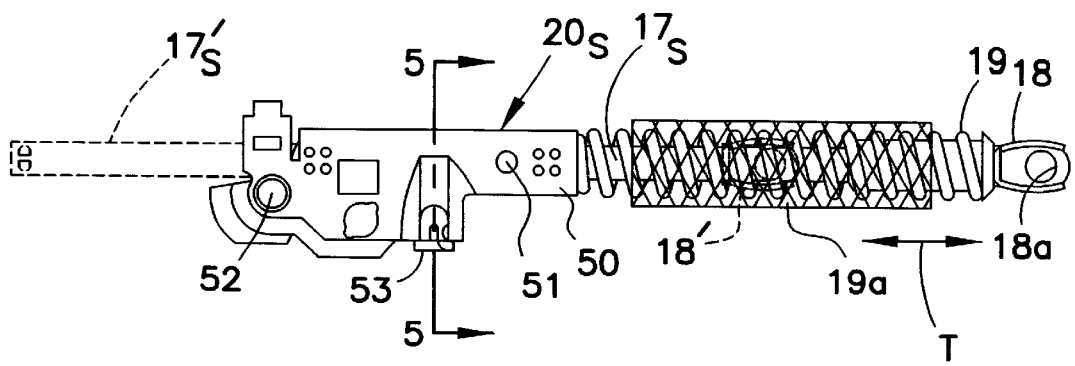
FIG. 4 is a side elevational view of an adjustment rod and locking mechanism of the prior art used in connection with the seat adjustment and dumping system of the present invention.
Figure 5:
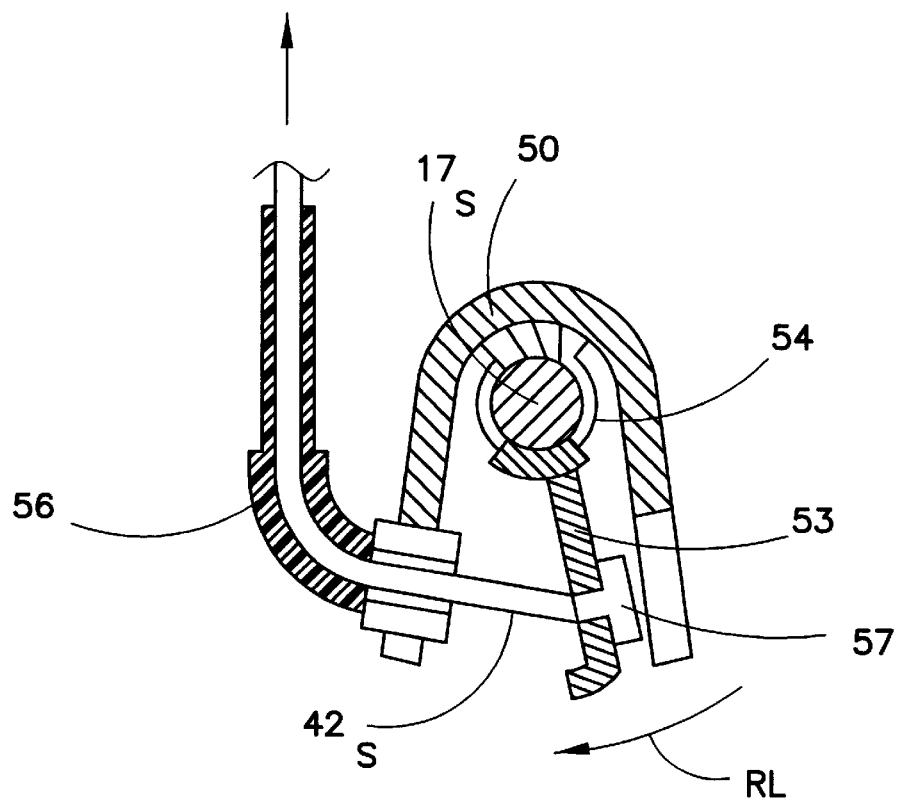
FIG. 5 is an end cross-sectional view of the locking mechanism depicted in FIG. 4 taken along line 5—5 as viewed in the direction of the arrows.

To satisfy the purposes and objects of the present invention, the locking mechanisms $20_M$ and $20_S$ can take on a variety of forms. It is essential, however, that the mechanisms be capable of positively engaging or grasping the corresponding adjustment rods $17_M$, $17_S$, to prevent unwanted translation of the rods. More specifically, the locking mechanisms must be capable of gripping the rods with enough force to react against the various loads applied to the set back B. These loads that the seat back must withstand without releasing our established industry safety standards. In the preferred embodiment of the invention, each of the locking mechanisms $20_M$, $20_S$ can constitute a MECHLOK™ mechanism, provided by Porter Engineered Systems Company. This particular locking mechanism is described in U.S. Pat. No. 5,441,129, assigned to the assignee of the present invention, the details of which are incorporated herein by reference. However, for a brief understanding of this mechanism, attention is directed to FIGS. 4 and 5. As previously explained, FIG. 4 illustrates the slave adjustment rod $17_S$ and locking mechanism $20_S$, which differs from the master side components due to the addition of the return spring 19. This return spring is not present on the master rod side of the adjustment mechanism, primarily because it would interfere with the other operating components of this system. However, it is understood that a similar return spring could be provided on the master rod side with appropriate modifications to those components.

As depicted in FIG. 4, the adjustment rod $17_S$ can translate relative to locking mechanism $20_S$ from the position fully extended to the right, to the retracted position $17'_S$, in which the mounting heads are at the position 18'. Again, the length of stroke of each adjustment rod can be predetermined to provide a predetermined range of angular movement of the seat back B.

In the illustrated embodiment, each locking mechanism, such as mechanism $20_S$, includes a housing 50 that defines a pair of mounting recesses 51 at opposite sides thereof. The mounting recesses 51 are situated to engage the marker dock 35 (see FIG. 7). The housing further includes a pair of mounting pins 52 that can be used to attach the locking mechanism $20_S$ to the seat carriage 11. As shown best in FIG. 5, the locking mechanism includes a pair of clutch springs 54 that are concentrically disposed about the adjustment rod $17_S$. As explained in more detail in the '129 patent, the clutch springs 54 have a free state diameter that is smaller than the diameter of the adjustment rod. Thus, when each of the springs is released, they wind around and grip the adjustment rod $17_S$ to provide a solid frictional clamping force.

In the neutral state of the system of the present invention, the clutch springs 54 are clamped about each of the adjustment rods. In order to release the mechanism, a release lever 53 is provided that projects from each of the clutch springs 54. As the release levers are rotated in the direction of the arrow RL, each of the clutch springs uncoil from about the adjustment rod so that their internal diameters are increased. When the release lever 53 has been fully actuated, the clutch springs 54 define an internal diameter that is larger than the diameter of the adjustment rod $17_S$, so the rod is free to translate through the clutch springs and within the locking mechanism $20_S$.

The release lever 53 is rotated by activation of the actuator cable $42_S$. More particularly, the cable passes through a cable fitting 56 that is attached to the housing 50. The cable can terminate in an enlarged head 57 that engages the release the lever 53. As the cable is pulled, it pulls back on the release lever 53 causing it to rotate in the direction RL to release the clutch spring 54.

Figure 6:
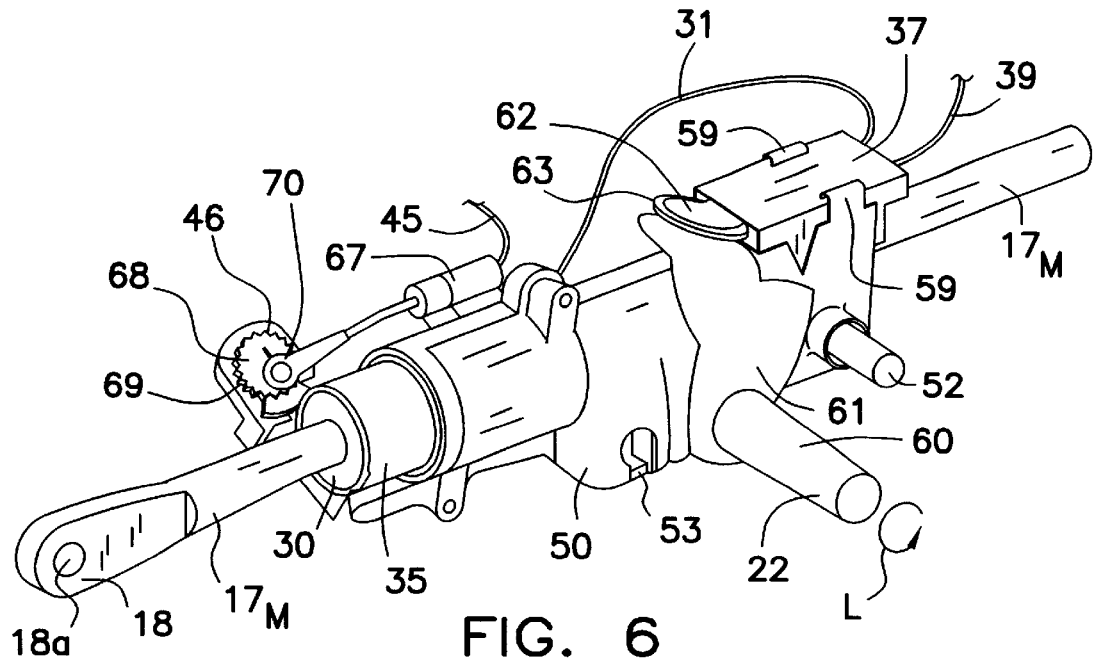
FIG. 6 is a top perspective view of an adjustment rod and locking mechanism, such as the mechanism shown in FIG. 4, as modified in accordance with a preferred embodiment of the present invention.

Details of the master adjustment rod $17_M$ and locking mechanism $20_M$ can be seen in FIG. 6. Again, as indicated above, the master side of the system does not include the return spring 19; however, the master side does include the recline input 22. In accordance with the preferred embodiment of the invention, this input includes an attachment post 60 that projects outward form the locking mechanism $20_M$. This attachment post can be knurled or otherwise configured to engage a lever arm that is readily manipulated by the passenger at the side of the seat S. As indicated by the circular arrow V, the attachment post 60 is mounted to the housing 50 so that it can rotate about its own axis.

The attachment post 60 is connected to or integral with a lever arm 61 that wraps around one side of the lock housing 50. The lever arm 60 terminates in a cable spool 62 situated above the top of the locking mechanism. It is this cable spool that allows the recline input 22 to operate or activate two cables by a single user input. In accordance with the preferred embodiment the two cables can be designated as a first output, corresponding to the cable 39 connected to the transfer mechanism 26, and a second output, corresponding to the marker cable 31. The two cables are connected by a cable loop 63 that wraps around the spool 62. Preferably, a cable block 37 is provided through which the two cables 31, 39 pass to connect at the cable loop 63. The cable block 37 is supported on the locking mechanism housing 50 by way of a pair of mounting clips 59.

It should be understood that as the attachment post 60 is rotated, the lever arm 61 pivots relative to the housing 50. As the lever arm 61 pivots, the cable spool 62 also pivots and, in effect, translates along the housing toward the rear of the assembly. As the cable spool 62 moves backward, it applies tension to the corresponding cables 31 and 39, which tension finds its way to the locking mechanism of the marker 30, as well as to the transfer mechanism 26. With this feature, a single passenger input at the recline input 22 can release the marker 30 while simultaneously releasing the two locking mechanisms $20_M$ and $20_S$. This action allows the seat back frame 10 to be freely rotated to a particular angle of recline A (FIG. 1(b)). Once the recline input 22 is released or deactivated, the lever arm 61 rotates back to its normal position, the tension is released on the two cables 31 and 39 and the corresponding locking mechanisms are thereby allowed to engage the corresponding rods $17_M$ and $17_S$.

Details of the memory feature of the invention can be discerned from FIGS. 6–9. As shown in FIG. 6, the marker 30 can reside within the marker dock 35 in the normal condition of the mechanism. When the marker is in this position, the seat back is at the user adjusted angle A. The marker 30 includes a locking mechanism that is sufficiently strong to hold this position when the recline input 22 has been released; however, the marker locking mechanism need not bear the entire load of the seat back since the master and slave locking mechanism $20_M$, $20_S$ should also be engaged around the corresponding adjustment rod.

The marker dock 35 defines an interior surface 72 that slides over the end of the housing 50. An engagement dimple 73 projects from the surface 72 and is sized to fit within the mounting recess 51 on the opposite sides of the locking mechanism housing 50. Preferably, the marker dock 35 and engagement dimple 73 are formed of a material that allows the dock to be snap-fit onto the end of the locking mechanism housing 50. Alternatively, the marker dock 35 can be provided in two halves that are connected together by bolting through the ears 74.

The marker dock 35 defines a docking surface 75 through which the marker 30 travels. The marker 30 can include a snap-fit tab 92 (see FIG. 8) configured to engage a corresponding recess (not shown) within the docking surface 75 of the marker dock 35. This snap-fit tab 92 can help hold the position of the marker 30 within the marker dock 35 when the marker locking mechanism has been released. Thus, the snap fit tab 92 helps hold the marker in position even as the adjustment rod $17_M$ passes through the marker 30.

Figure 9:
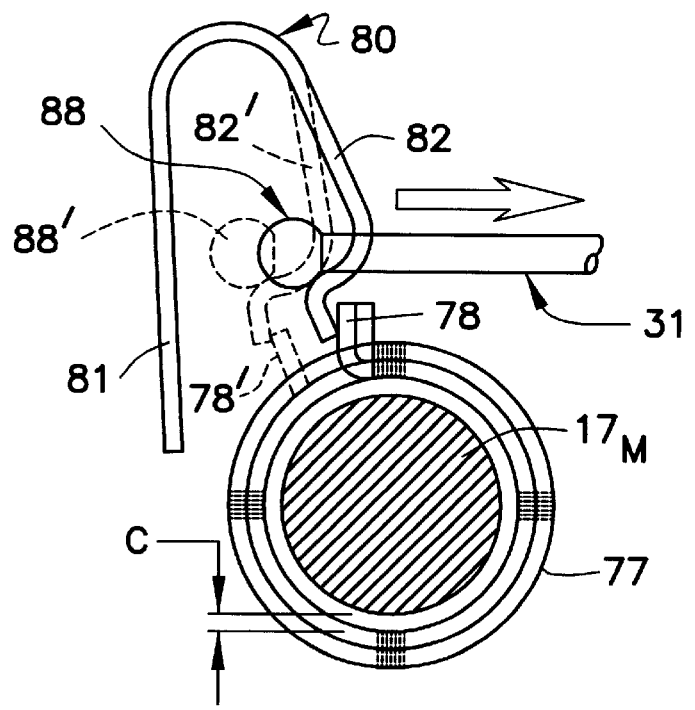
FIG. 9 is an end view of the locking mechanism shown in FIG. 8 depicted with an actuator rod passing therethrough.

The marker 30 preferably uses a locking mechanism similar to the MECHLOK™ described above. Thus, as shown in FIG. 9, the locking mechanism can constitute a pair of clutch springs 77 that are disposed about the master adjustment rod $17_M$. In the position shown in solid lines in FIG. 9, the clutch springs 77 are released, so that their internal diameters are larger than the diameter of the adjustment rod. This released condition provides a clearance C between the rod and the clutch spring 77 that is sufficient to allow the rod to translate freely within the marker 30 and clutch springs 77. (It should of course be understood that this clearance C has been exaggerated in the figure for clarity). The neutral state of the clutch springs 77 is shown in the phantom lines in FIG. 9. In this neutral state, the springs engage the adjustment rod so that the marker 30 moves as the rod moves.

The clutch spring 77 is provided with an actuation tang 78 that projects through a tang slot 86 defined in the marker 30. This tang 78 is in turn engaged by a lever spring 80 that is supported within the marker dock 35. The lever spring 80 includes a fixed arm 81 that is fixed or attached to the marker dock 35. In this way, the lever spring 80 does not move with the marker 30, but instead remains in the docking position. The lever spring 80 further includes a moving arm 82 that includes an engagement tab 83 at the base of the arm configured for contacting and pushing the actuation tang 78 of the clutch spring 77. This tang engagement tab 83 is configured to slide within the tang slot 86 of the marker 30.

It should be understood that the tang slot 86 is aligned with the engagement tab 83 only when the marker 30 is fully docked within the marker dock 35, most particularly when the snap-fit tab 92 is engaged within the corresponding recess of the marker dock. With the marker so positioned, the lever spring 80 can be activated by operation of the marker cable 31 (second output from the recline input 22). In the illustrated embodiment, the cable passes through a cable fitting 84 that is affixed to the underside of the marker dock 35. The cable then passes through a slot 87 in the moving arm 82 of the lever spring 80. A ball end fitting 88 at the end of the cable engages the back side of the moving arm 82, shown most clearly in FIG. 9. When the cable 31 is activated or placed in tension, it pulls the ball end fitting 88 from its initial neutral position 88', to its activated position to the right of the initial position, as illustrated in FIG. 9. In this activated position, the tab 83 engages the actuation tang 78 which uncoils the clutch spring 77 from around the adjustment rod $17_M$. At that point, then, the marker remains stationary within the marker dock 35 even as the adjustment rod $17_M$ translates through the interior of the marker.

Figure 7:
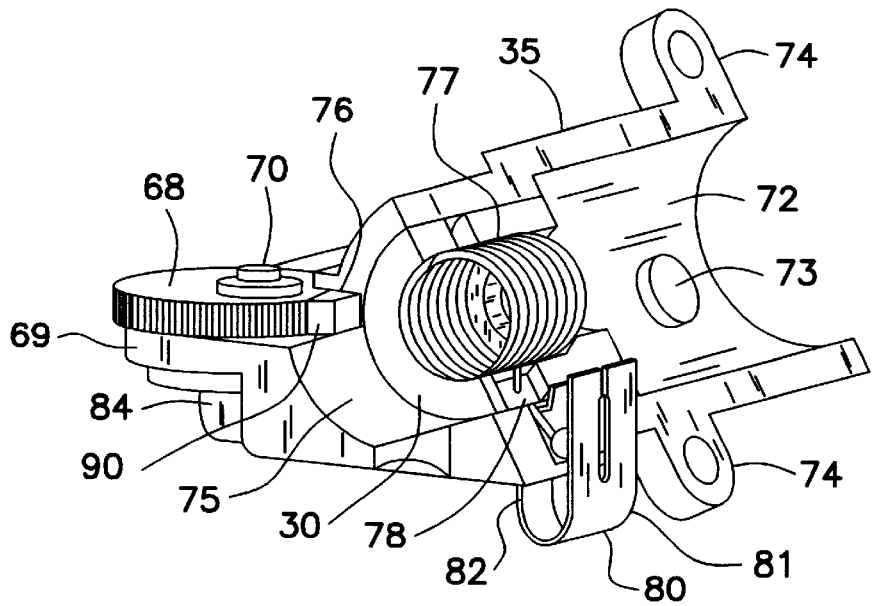
FIG. 7 is an exploded partial cross-sectional view of the memory and reset features of one preferred embodiment of the present invention.
Figure 8:
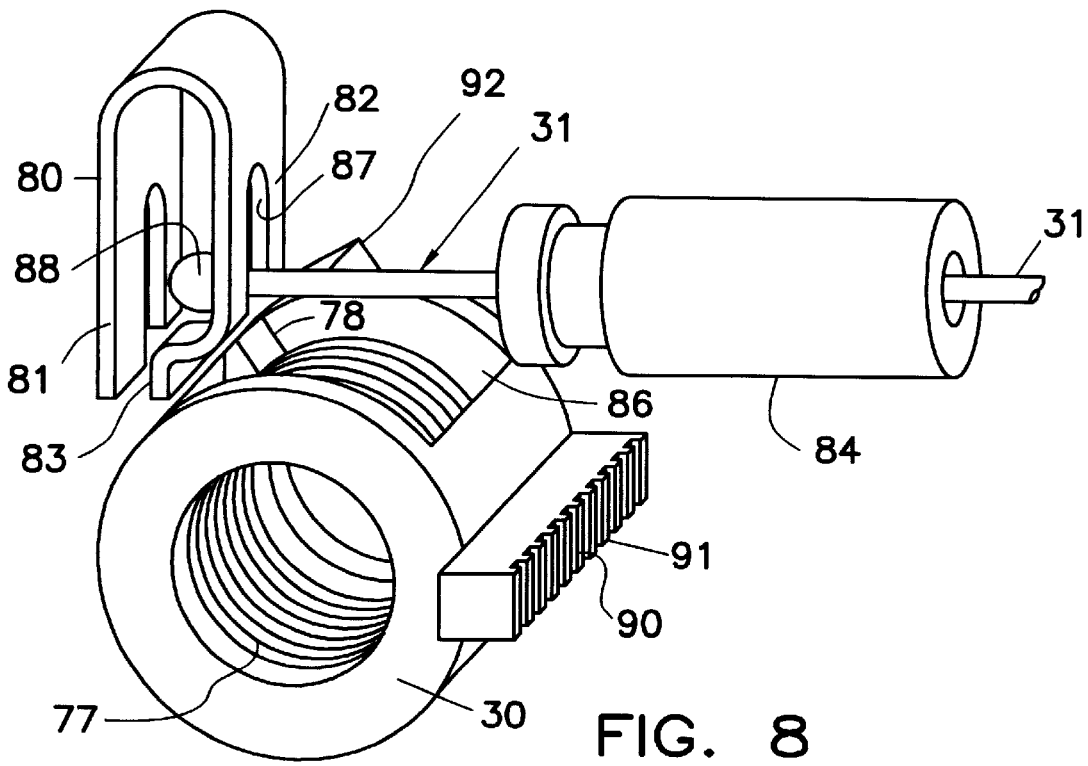
FIG. 8 is an enlarged cut away view of the locking mechanism of the memory feature depicted in FIGS. 6 and 7.

Another aspect of the inventive system is depicted best in FIGS. 6 and 7. Specifically, the invention contemplates a reset mechanism 46 that, as previously described, maintains all of the locking mechanisms in their open state during the dumping cycle to permit free movement of the adjustment rods $17_M$, $17_S$. One element of the reset system is a reset rack 90 that is affixed to or integral with the marker 30. The rack 90 travels through a slot 76 defined in the marker dock 35 as the marker 30 moves into and out of the dock. This rack 90 includes an array of teeth 91 (see FIG. 8) that are configured to selectively engage corresponding teeth on a reset gear 68, which forms part of the reset mechanism 46.

The reset gear 68 is supported on the marker dock 35 by a gear mount 69. Specifically, the gear 68 is configured to pivot about its axis. The reset gear 68 is connected to the reset cable 45 by an eye fitting 70 that is eccentrically mounted on the reset gear 68, as depicted in FIG. 6. The cable 45 preferably passes through a cable fitting 67 that is mounted to or integral with the marker dock 35.

In accordance with this aspect of the invention, the reset gear 68 rotates as the rack 90 translates linearly along the length of the adjustment rod $17_M$. In other words, the gear 68 and rack 90 operate in the form of a rack and pinion mechanism, with the translational movement of the marker 30 being converted to rotational movement of the gear 68. As the gear 68 rotates, the eye fitting 70 also rotates from its neutral position as depicted in FIG. 6, to a position preferably about a quarter turn around the gear. In this orientation, the eye fitting 70 places the reset cable 45 in tension. Activation of the reset cable 45 is manifested at the transfer mechanism 26 in a manner described in more detail herein. It is understood that the reset gear 68 and rack 90 can constitute a cam mechanism in which movement of the marker is translated to a specific movement of the reset cable 45.

The timing and manner of activation of the various cables of the seat adjustment and dumping system are all coordinated through the transfer mechanism 26. In other words, operation of the recline input 22 does not directly operate the actuator cables $42_M$, $42_S$, or the marker cable 31. Moreover, activation of the dump input 24 does not likewise operate the various actuator cables, or the reset cable. Instead, the actuation of these various cables occurs at the transfer mechanism 26.

Figure 10:
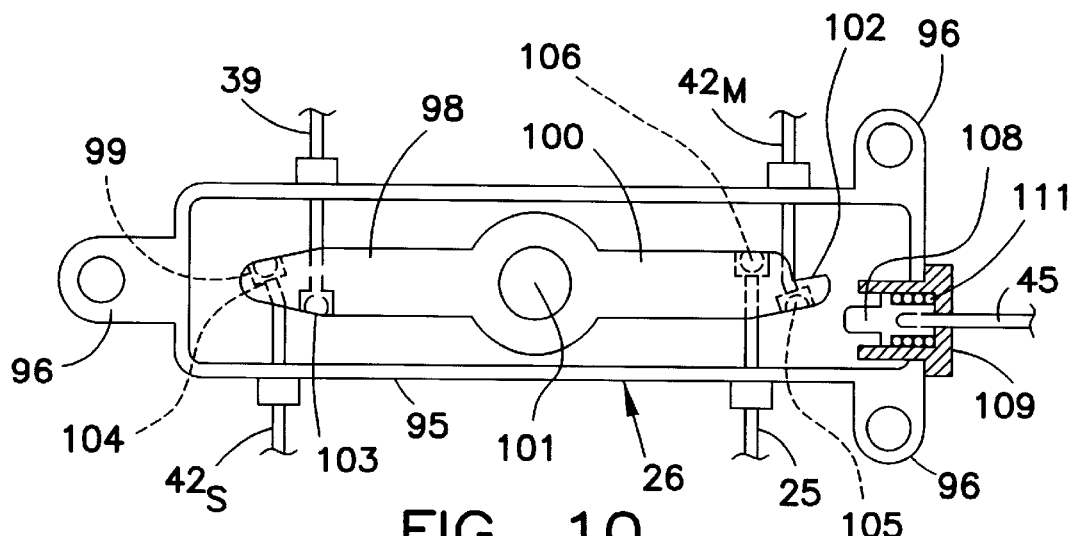
FIG. 10 is a top cut-away view of a transfer mechanism used with the embodiment of the invention depicted in FIG. 3.

One embodiment of a transfer mechanism 26 is depicted in FIG. 10. In particular, the mechanism includes a housing 95 that can be attached to the seat carriage 11 by way of mounting ears 96. A transfer lever 98 is disposed within the housing 95. More specifically, the lever 98 is mounted for rotation at a pivot 101 generally in the center of the housing 95. The transfer lever 98 includes an adjustment input arm 99 at one end and a dump input arm 100 at an opposite end. The dump input arm 100 further defines a notch 102 at its free end that coordinates with the reset mechanism 46 (FIG. 3).

Each arm includes a pair of cable mounts, namely, mounts 103 and 104 in the adjustment input arm 99, and mounts 105 and 106 in the dump input arm 100. The cable mount 103 can constitute a first input to the transfer mechanism 26, while the mount 104 constitutes a slave output. Likewise, mount 105 constitutes a master output, while mount 106 correspond to a second input to the transfer mechanism 26. More specifically, the first output cable 39 from the recline input 22 is connected at the first input cable mount 103. The slave actuator cable $42_S$ is connected at the cable mount 104 at the end of adjustment input arm 99. The master actuator cable $42_M$ is attached at the mount 105, while the dump cable 25 engages the dump input arm 100 at the second input cable input cable mount 106.

By way of brief introduction prior to a more detailed discussion with reference to the schematics FIGS. 13–16, the pivoting movement of the transfer lever 118 is governed by either of inputs, namely recline output cable 39 or dump cable 25. For instance, when the passenger activates the recline input 22, the first output cable 39 is placed in tension by operation of the lever arm 61, as described above. When this cable is placed in tension it pulls the adjustment input arm 99 upward in FIG. 10 toward the cable 39. This action thereby places both the master and slave actuator cables $42_M$, $42_S$ in tension. In other words, as the transfer lever 98 pivots, the adjustment input arm 99 moves away from the slave actuator cable $42_S$, thereby putting it in tension.

Similarly, rotation of the transfer lever 98 due to input from the cable 39, causes the dump input arm to pivot away from the master cable $42_M$, thereby placing that cable in tension. As explained above, when these two cables are in tension, they release the two locking mechanisms $20_M$, $20_S$, which thereby allows the adjustment rods $17_M$, $17_S$ to translate freely within the locking mechanisms. Thus, in the adjustment cycle, activation of the recline input 22 provides an output at cable 39. This output is provided as a first input to the transfer mechanism 26 which results in an output at actuator cables $42_M$, $42_S$. This output at the two actuator cables releases the corresponding locking mechanisms.

In addition, when the recline input 22 is activated, the lever arm 61 also places the marker cable 31 in tension. It should be understood that this second output from the recline input 22 is independent of the transfer mechanism 26. Nevertheless, activation of the marker cable 31 releases the clutch spring 77 of the marker, thereby allowing the adjustment rod $17_M$ to translate freely without the marker moving with it. In this way, when the recline input 22 is activated, the passenger is able to freely adjust the angle A of the seat back to a comfortable position. Once the recline input 22 has been released, or returned its neutral state, the tension on output cable 39 and marker cable 31 is released. When the marker cable 31 is released, the clutch spring 77 re-engages the adjustment rod $17_M$ to establish the memory location within the marker dock 35. Simultaneously, releasing the tension on first output cable 39, causes the transfer lever 98 to return to its neutral position, which thereby releases the tension on the two actuators cables $42_M$ $42_S$. Of course, it is understood that when these actuators cables are released, the locking mechanisms $20_M$, $20_S$ re-engage about their corresponding adjustment rods $17_M$, $17_S$.

A similar action occurs when the second input to the transfer mechanism 26 is activated, namely the dump cable 25. When this cable is activated, it is placed in tension, thereby pulling the dump input arm 100 toward the cable 25. This input has the same effect on the actuator cables $42_M$, $42_S$ as activation of the first output cable 39. Thus, further detailed explanation is believed unnecessary. It should be understood then, that activation of the dump input 24 places the dump cable 25 in tension, which is conveyed through the transfer mechanism 26 to open the locking mechanism $20_S$, $20_M$ allowing the seat back to be pivoted forward.

It is significant that since the dump cable 25 is connected only to the transfer mechanism 26, there is no effect on the marker cable 31 or marker 30. Thus, the marker cable 31 is not activated, its only means of activation coming from operation of the recline input 22. This means, then, that the clutch spring 77 within the marker 30 remains in its engaged position clamped about the master adjustment rod $17_M$. Consequently, the marker 30 will move with the adjustment rod as the rod is translated back and forth by the passenger pivoting the seat back to its dump position (see FIG. 1(c)). This feature of the marker provides the memory element of the present invention. Specifically, the marker 30 will translate into the marker dock 35, thereby fixing the position of the master adjustment rod $17_M$ to a position that corresponds to the user selected angle A once the seat back B has been restored to its upright position.

As indicated above, during the dumping operation it is imperative that the locking mechanisms $20_M$, $20_S$ remain open and disengaged from the corresponding adjustment rods. The reset mechanism 46 (FIG. 6)and cable 45 provide this capability. In the embodiment of the transfer mechanism 26 depicted in FIG. 10, the free end of the reset cable 45 is engaged to a plunger 108 that is disposed within a plunger housing 109. A spring 111 is situated between the housing 109 and enlarged ring of the plunger 108 to provide a biasing force on the plunger. Specifically, the spring 111 biases the plunger outward from the housing 109 into the transfer mechanism housing 95. More specifically, the spring 111 biases the plunger 108 into an interference position relative to the notch 102 defined in the end of the dump input arm 100. In addition, the spring 111 places the cable 45 in tension between the reset mechanism 46 and transfer mechanism 26.

During the dump cycle, activation of the dump input 24 causes rotation of the transfer lever 98 so that the dump input arm 100 is pulled closer to the dump cable 25. In this position, the notch 102 is exposed to the plunger 108. Movement of the plunger 108 is governed by movement of the reset cable 45, which in turn is controlled by rotation of the reset gear 68. The reset gear 68 only rotates when the marker rack 90 contacts the gear and translates within the marker dock 35. The rack 90 will translate when the marker 30 translates along with the adjustment rod $17_M$. The adjustment rod $17_M$ will translate when the passenger pivots the seat back forward to its dump position. In other words, once the locking mechanisms $20_M$, $20_S$ are released, the passenger can freely manipulate the seat back. Since the marker 30 is clamped to the adjustment rod $17_M$, the passenger is unable to adjust the seat back B rearwardly, since movement in this direction is prevented by the marker 30 being snap-fit or fixed within marker dock 35.

Thus, the only direction of movement of the seat back by the passenger is in the dump direction as depicted in FIG. 1(c). As the seat back is pivoted in that direction, the adjustment rods $17_M$, $17_S$ translate rearwardly relative to the locking mechanisms. This rearward movement carries the marker 30 with it so that the reset rack 90 rakes across the reset gear 68. This movement then causes the reset gear 68 to rotate in a clockwise direction as depicted in FIG. 6. This clockwise movement then translates to activation of the reset cable 45.

Figure 11:
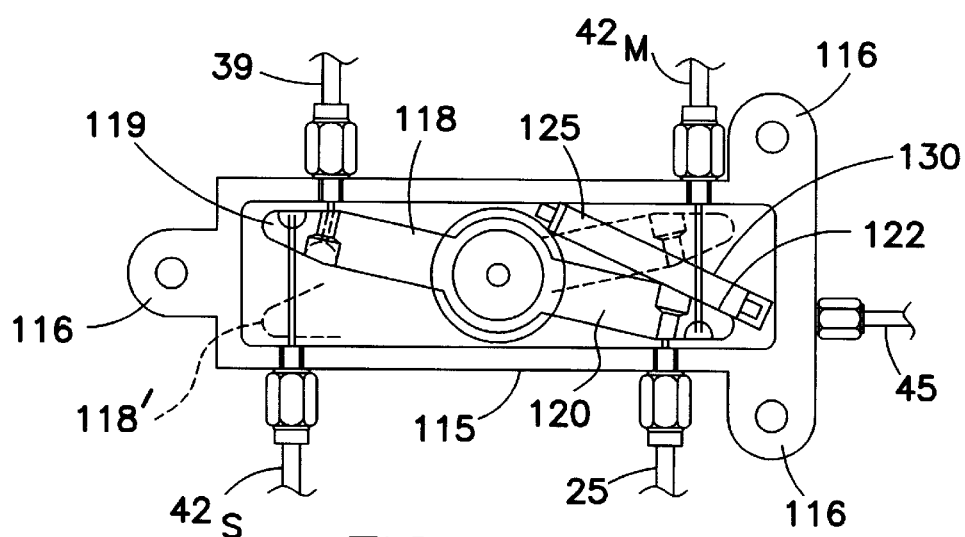
FIG. 11 is a top cut-away view of an alternative embodiment of a transfer mechanism for use with the seat adjustment and dumping system depicted in FIG. 3.
Figure 12:
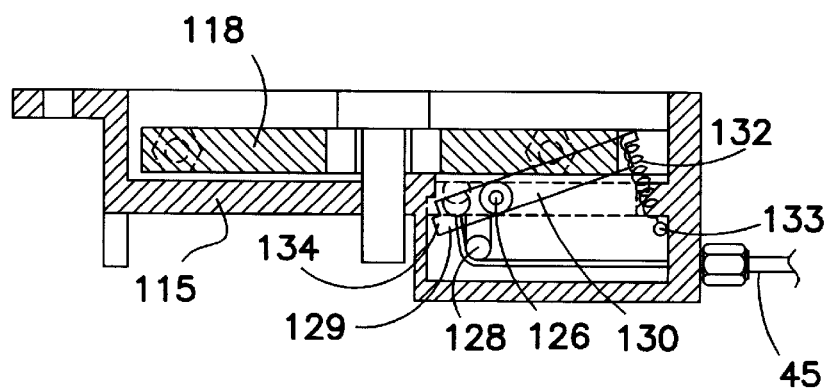
FIG. 12 is a side cross-sectional view of the transfer mechanism shown in FIG. 11.

It should be pointed out that the orientation of the eye fitting 70 is arranged to correspond to the transfer mechanism as depicted in FIGS. 11 and 12. In other words, the plunger 108 in the mechanism of FIG. 10 requires that the cable be extended so that the plunger extends into the transfer mechanism housing 95. This extension can occur if the eye fitting 70 is mounted 180° opposite the position shown in FIG. 6. Thus, as the reset gear 68 rotates in a clockwise direction, the gear and eye fitting 70 ease the tension applied to the cable 45 by the biasing spring. As the reset gear 68 rotates, the biasing spring 111 is permitted to push the plunger into the path of the dump input arm 100.

At this point, with the plunger 108 is in its activated position blocking the return rotation of the transfer lever 98. Consequently, so long as the marker 30 is not disposed within the marker dock 35 (which corresponds to the seat back being pivoted forward (backward?) to its preset angle A), the plunger 108 will prevent movement of the transfer lever 98, which thereby prevents deactivation of the actuator cables $42_M$, $42_S$. This in turn maintains the locking mechanism $20_M$, $20_S$ in their released condition, even if the dump input itself is released. Thus, the reset mechanism 46 and reset plunger 108 perform a valuable function of preventing the seat back B from being locked in its dump forward position when the dump input 24 is inadvertently released.

With the reset mechanism engaged, the seat back B can be freely pivoted forward, or either backward to a certain degree. However, when the seat back is pivoted back toward its memory position (corresponding to angle A), the marker rack 90 will re-engage the reset gear 68. Continued translation of the marker 30 into the marker dock 35 causes the rack to rotate the reset gear 68 until the eye fitting 70 is in its neutral position. When in the neutral position, reset plunger 108 is pulled clear of the notch 102 of the dump input arm 100, which then allows the transfer lever 98 to rotate back to its own neutral position. Thus, the reset mechanism remains activated until the seat back has been restored to the passenger selected angle A.

The most preferred embodiment of the reset mechanism is depicted in FIGS. 11 and 12. This mechanism relies upon tension applied to the reset cable 45, which of course corresponds to movement of the eye fitting 70 from the neutral position shown in FIG. 6 to a position rotated about one-quarter turn in the clockwise direction. Specifically, with this embodiment the transfer mechanism includes a housing 115 that can be fastened to the seat carriage 11 by way of mounting ears 116. A transfer lever 118 is pivotably disposed within the housing 115 in the same manner as described above. Likewise, the transfer lever 118 includes an adjustment input arm 119 and dump input arm 120. The transfer lever 118 is depicted in its activated position in solid lines and its neutral position in phantom lines in FIG. 11. The transfer lever 118 is engaged to the same cables as described above, namely the first input is at output cable 39, the second input is dump cable 25, and the first and second outputs are the slave and master actuator cables $42_S$, $42_M$. As shown in the phantom, when in the neutral position the transfer lever 118 is oriented so that no tension is being applied to the two actuator cables $42_M$, $42_S$. As with the embodiment of FIG. 10, activation of the first output cable 39 causes the transfer lever 118 to rotate, which places the master and slave cables in tension, thereby releasing or deactivating the corresponding locking mechanisms. Likewise, activation of the dump input 25 provides the same affect.

The transfer mechanism of the embodiment shown in FIGS. 11 and 12 differs from the embodiment of FIG. 10 in the reset function. In particular the dump input arm 120 of the transfer lever 118 provides a stop surface 122, rather than a notch, as (such as notch 102 of FIG. 10). In addition, the reset mechanism includes a reset lever 125 that is pivotally mounted at a mount 126 in the base of the housing 115. Specifically, the reset lever 125 is mounted so that it can pivot upward into the path of the transfer lever 118. When the reset lever 125 is pivoted upward, it contacts the stop surface 122 of the dump input arm 120, thereby preventing return rotation of the transfer lever. The reset cable 45 can pass through an extension of the housing 115 and around a cable guide 128 to engage an actuation and 129 of the lever 125. When tension is applied to the cable 45, it pulls the actuation end 129 down, which causes the blocking arm 130 of the lever to pivot upward about the pivot mount 126 and into the path of the transfer lever 118.

Preferably the reset mechanism includes a tension spring 132 engaged between a spring mount 133 and the blocking arm 130. The tension spring 132 operates to pull the blocking arm 130 down out of the path of the transfer lever 118 when no tension is applied to the cable 45. A limit notch 134 can be defined at the actuation end 129 of the lever to engage a surface of the housing 115 to restrict retracted pivot of the reset lever 125, and to prevent the actuation portion of the lever from pivoting upward to the housing 115. Again, the overall operation of the reset lever 125 is the same as the reset plunger 108. The lever 125 differs in that it is actuated by applying tension to the reset cable 45, rather than by releasing tension, as with the embodiment of FIG. 10.

Figure 13:
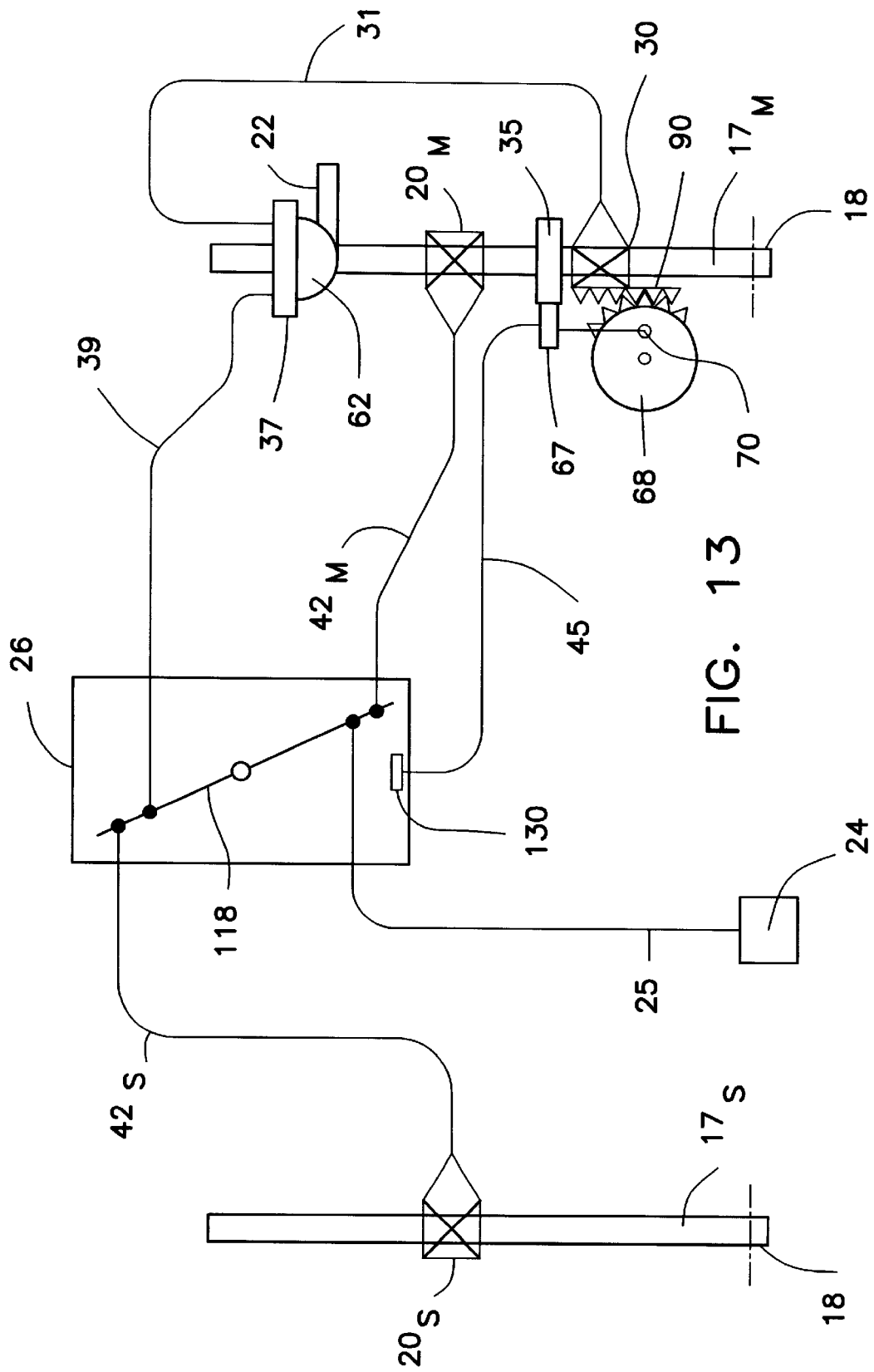
FIG. 13 is a schematic representation of the seat adjustment and dumping system depicted in FIG. 3 shown in its neutral position.
Figure 14:
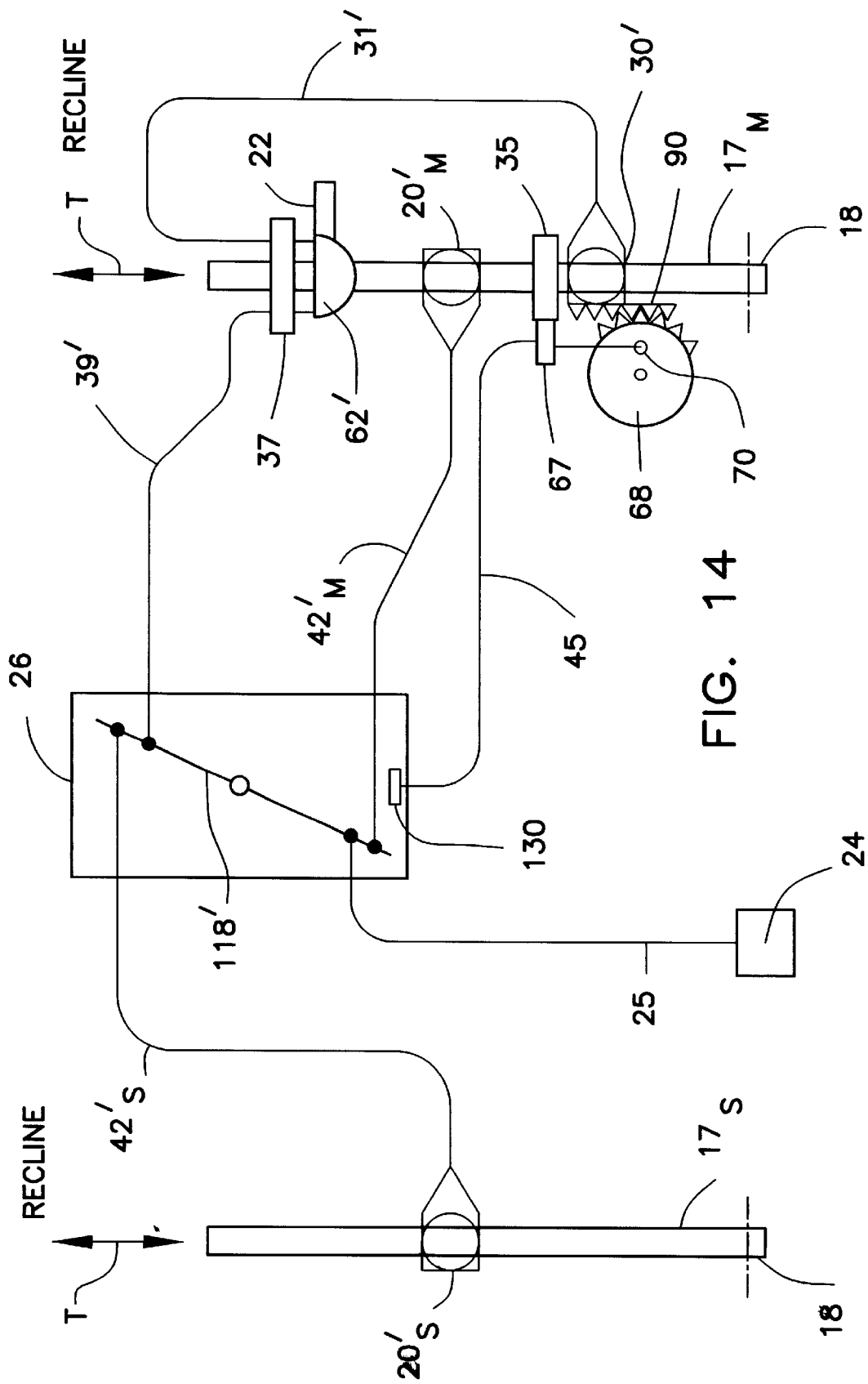
FIG. 14 is a schematic representation similar to the representation of FIG. 13, with the seat adjustment system activated to recline or adjust the angle of inclination of the seat back.

Having described all of the components of the system, attention can be turned to the schematic diagrams of FIGS. 13–16 to explain the operation of the adjustment and dumping system of the present invention. With reference to FIG. 13, the locking mechanism $20_M$, $20_S$ for the adjustment rods, and the locking mechanism for the marker 30 are depicted with an X when the locking mechanisms are activated or engaging the corresponding adjustment rods. The same locking mechanisms are depicted with an O when the corresponding clutch springs are released or disengaged from the corresponding rods.

FIG. 13 depicts the adjustment and dumping system in its neutral position. In this position, the marker 30 is engaged to the master adjustment rod $17_M$ and is housed within the marker dock 35. The two locking mechanisms $20_M$, $20_S$ are also engaged to the corresponding adjustment rods, to thereby hold the seat back at the user adjusted angle A, as shown in FIG. 1(b). In this neutral condition, none of the various cables are in tension. In addition, the reset gear 68, and most particularly the eye fitting 70 for the reset cable 45, is in its neutral position.

When the passenger operates the recline input 22, most particular by pivoting the attachment post 60, the cable spool 62 is moved to its activated position 62'. This movement places the first output cable 39' and the second output cable 31' (corresponding to the marker cable) in tension. When the marker cable is placed in tension, the clutch spring 77 within the marker 30 is released so that the marker is in its recline or adjustment configuration 30'. In this condition, the adjustment rods $17_M$ can translate in the direction of the arrow T without causing any movement of the marker 30, which is solidly docked within the marker dock 35.

The tension applied to the first output cable 39 by way of movement of the cable spool 62' causes the transfer lever to pivot to its activated position 118'. This results in applying tension to the actuator cable 42'$_S$ and 42'$_M$, which consequently releases the locking mechanisms, thereby allowing movement of the corresponding adjustment rods 17$_M$, 17$_S$. Thus, in the configuration shown FIG. 14, the passenger can freely adjust the angle of recline of the seat back to suit his/her personal taste. Once the recline input 22 has been released, the elements are restored to the configuration shown in FIG. 13.

Figure 15:
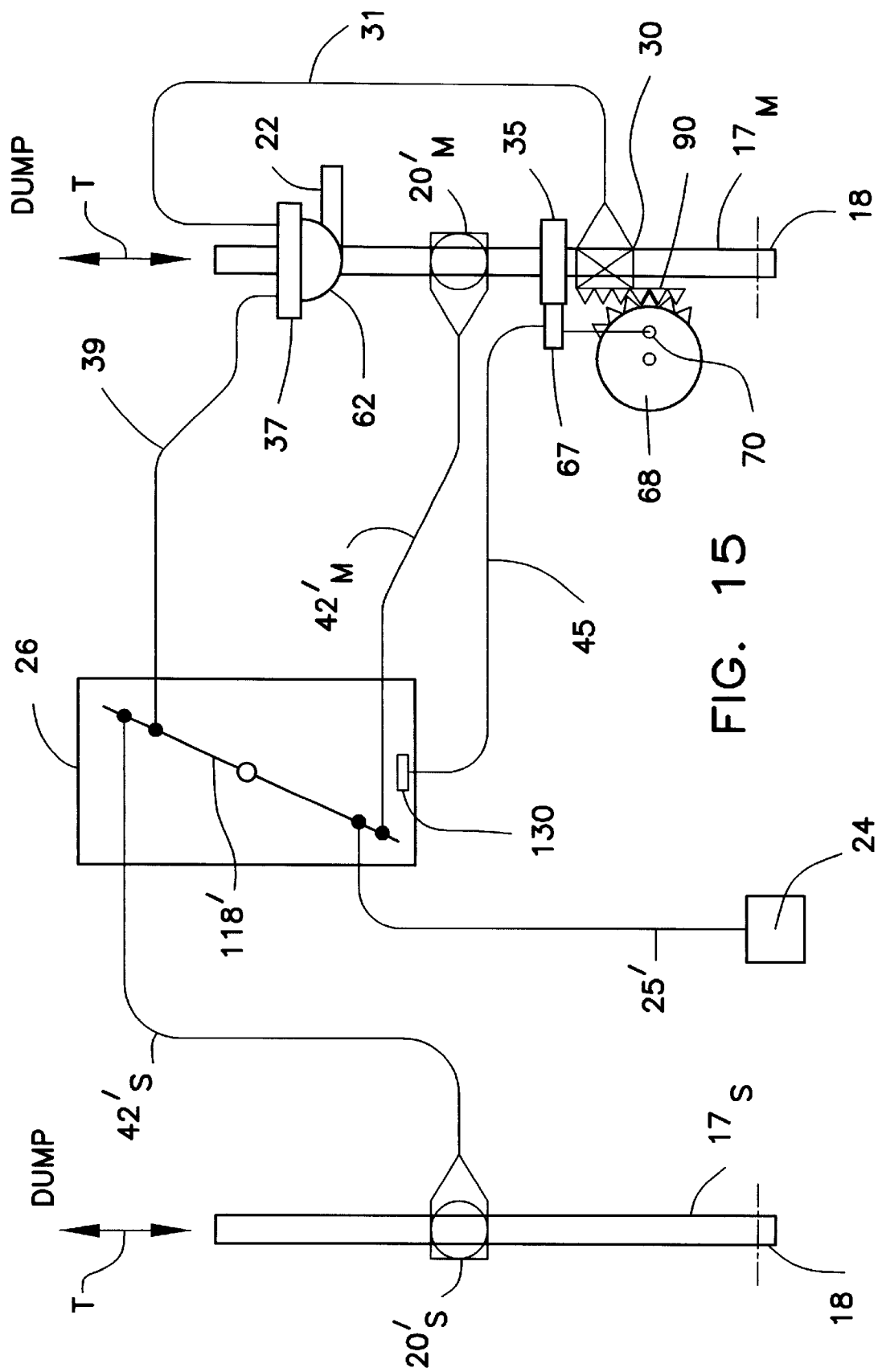
FIG. 15 is a schematic representation similar to the representation in FIG. 13 with the system actuated to dump the seat back.

On the other hand, when the dump input 24 is activated, the system operates according to the schematics shown in FIGS. 15 and 16. It should be first noted that operation of the dump input 24 has no effect on the recline input 22. Thus, neither output cable 31 nor 39 is placed in tension when the dump input is activated. This means that the marker 30 remains clamped on the master adjustment rod 17$_M$, since activation of cable 31 is necessary to release the clutch spring 77 within marker 30.

On the other hand, activation of the dump input 24 applies tension to the dump cable 25'. This tension then pulls the transfer lever to its activated position 118', which is the same position as during the recline cycle shown in FIG. 14. As during the recline cycle, the dump cycle relies upon activation of the actuator cables 42'$_S$ and 42'$_M$, to open the locking mechanisms, thereby permitting translation of the adjustment rods in the dump mode.

Once the locking mechanism has been released, the passenger can manipulate the seat back to translate the adjustment rods to the positions shown in FIG. 16. As the master adjustment rod 17$_M$ translates, it carries the marker 30 with it to the position 30", since the marker is firmly clamped to the adjustment rod. As explained above, movement of the marker causes translation of the rack 90 which leads to rotation of the reset gear 68. Rotation gear moves the blocking arm 130 into its activated position to prevent return of the transfer lever 118 to its neutral position.

It then can be seen that regardless of the state of the dump input 24, the transfer lever 118 will remain in its activated position 118' until the blocking arm 130 has been released from its activated position 130'. When the seat back is restored to its full upright and locked position, the adjustment rods 17$_M$ translate forward, which causes the marker 30 to translate forward, which ultimately results in rotation of the reset gear 68 back to its neutral position, thereby releasing the tension on the reset cable 45.

From the foregoing, certain beneficial features of the present invention should be apparent. First, the invention separates certain aspects of the recline and dump features help maintain the passenger selected memory position for the seat back. Second, the present system relies upon small and inexpensive cable to provide the activation for the various components. The transfer mechanism 26 is an integral element of this feature. Instead of relying upon expensive and complicated components, a cable arrangement is sufficient to control the timing of the activation and deactivation of the various locking mechanisms.

A further advantage provided by the present invention is that the cables themselves do not carry any load, but instead are only required to sustain a necessary amount of tension to activate or deactivate the various locking mechanisms. Thus, the bulk of the operating components of the present invention can be easily formed of strong, but inexpensive plastic, rather than of more expensive and difficult to manufacture metal as with previous devices. For instance, the entire transfer mechanism 26 can be formed of plastic, as can the reset gear 68 and marker rack 90. In addition, the marker 30 and the marker dock 35 themselves can be formed of plastic since the marker need not carry the substantial loads associated with supporting the seat back in its desired position.

Since the locking mechanisms 20$_M$, 20$_S$ and adjustment rods 17$_M$, 17$_S$ carry the lion's share of the load exerted on the seat back frame 10, these components are formed primarily of high strength metal. In addition, since the present system is cable-based, the components are compact and lightweight so that they can fit within a broader range of envelopes than previous seat adjustment mechanisms.

While the present invention contemplates a mechanical cabling system, certain alternative embodiments can rely upon electrical activation and deactivation of various locking mechanisms. For instances, the locking mechanisms 20$_M$, 20$_S$ can be controlled by an electrical solenoid. The signals provided to the solenoids can be governed by signals generated from an appropriately modified transfer mechanism 26. In addition, the locking mechanism themselves can take on a variety of forms, some of which are mechanical cable activated and others of which might be electrically activated.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A seat adjustment mechanism which adjusts the angle of a seat back pivotably mounted to a support frame, comprising:

an elongated adjustment rod connected to the seat back so that said rod translates along its length as the seat back is pivoted relative to the support frame;

a locking mechanism supported on the support frame and supporting said adjustment rod, said locking mechanism selectively operable in a released state to permit said adjustment rod to translate relative to said locking mechanism, and in an engaged state to engage said adjustment rod at a first position along the length thereof corresponding to a selected angle of the seat back relative to the support frame;

a memory mechanism operably associated with said adjustment rod and selectively operable in a first state to disengage said rod to permit translation of said rod relative to said memory mechanism and in a second state to engage said rod at a second position along the length thereof corresponding to the selected angle of the seat back;

an adjustment actuator connected to said locking mechanism and said memory mechanism and having an adjustment state operable to place said locking mechanism in said released state and said memory mechanism in said first state, and a locking state operable to place said locking mechanism in said engaged state and said memory mechanism in said second state; and a dump actuator connected to said locking mechanism and selectively operable only on said locking mechanism to place said locking mechanism in said adjustment state.

2. The seat adjustment mechanism according to claim 1, wherein said memory mechanism includes a marker locking mechanism concentrically disposed about said adjustment rod.

3. The seat adjustment mechanism according to claim 2, wherein said marker locking mechanism includes at least one clutch spring concentrically disposed about said adjustment rod.

4. The seat adjustment mechanism according to claim 3, wherein said at least one clutch spring includes a release lever operable to selectively engage or disengage said clutch spring from said adjustment rod, said release lever connected to said adjustment actuator.

5. The seat adjustment mechanism according to claim 1, wherein said memory mechanism includes:
- a memory marker selectively engageable about said adjustment rod; and
- a marker dock supported on the support frame and configured to support said memory marker when said memory mechanism is in said first state.

6. The seat adjustment mechanism according to claim 5, wherein said memory mechanism includes a memory locking mechanism disposed between said memory marker and said marker dock, said memory locking mechanism engaged about said adjustment rod when said memory mechanism is in said second state, and disengaged from said adjustment rod when said memory mechanism is in said second state and only when said memory marker is disposed within said marker dock.

7. The seat adjustment mechanism according to claim 6, wherein said memory locking mechanism includes:
- a clutch spring carried by said marker, said clutch spring having a release lever operable to selectively engage or disengage said clutch spring from said adjustment rod; and
- said marker dock supports an actuation lever connected to said adjustment actuator and operable to actuate said release lever only when said marker is within said marker dock.

8. The seat adjustment mechanism according to claim, wherein:
- said actuation lever is a lever spring; and
- said actuation lever is connected to said adjustment actuator by a cable.

9. The seat adjustment mechanism according to claim 5, wherein said memory mechanism includes a snap-fit portion between said marker and said marker dock to releasably hold said marker within said marker dock.

10. The seat adjustment mechanism according to claim 5, wherein said marker dock is attached to said locking mechanism.

11. The seat adjustment mechanism according to claim 1, wherein said adjustment actuator includes:
- an input lever pivotably supported on said locking mechanism;
- a cable spool attached to said input lever; and
- a cable wound around said spool and having a first end connected to said locking mechanism and a second end connected to said memory mechanism,
- whereby pivoting said input lever pivots said cable spool to pull said cable wound around said spool.

12. The seat adjustment mechanism according to claim 1, further comprising:
- a transfer mechanism having a first input connected to said adjustment actuator, a second input connected to said dump actuator, and an output connected to said locking mechanism, said transfer mechanism operable upon actuation of either said adjustment actuator or said dump actuator to activate said output to place said locking mechanism in said released state, and upon deactivation of both said adjustment actuator and said dump actuator to deactivate said output to place said locking mechanism in said engaged state.

13. The seat adjustment mechanism according to claim 12, wherein said transfer mechanism includes a cable connected between said first input and said adjustment actuator, a cable connected between said second input and said dump actuator, and a cable connected between said output and said locking mechanism.

14. The seat adjustment mechanism according to claim 12, wherein said transfer mechanism includes a stop selectively operable to prevent deactivation of said output.

15. The seat adjustment mechanism according to claim 14, wherein said transfer mechanism includes a reset mechanism operably connected between said memory mechanism and said stop, said reset mechanism operable to operate said stop only when said memory mechanism is engaged to said adjustment rod and said rod is translated along its length.

16. The seat adjustment mechanism according to claim 15, wherein said reset mechanism includes a rack and pinion gear between said stop and said memory mechanism.

17. The seat adjustment mechanism according to claim 16, wherein:
- said memory mechanism includes;
- a memory marker selectively engageable about said adjustment rod; and
- a marker dock supported on the support frame and configured to support said memory marker when said memory mechanism is in said first state; and
- said reset mechanism includes;
- said rack attached to said memory marker;
- said pinion gear is mounted relative to said marker dock for rotation from a neutral position as said rack translates with said memory mechanism, said neutral position associated with said marker being in said marker dock; and
- a cable eccentrically mounted at one end to said pinion gear and at an opposite end to said stop.

18. A seat adjustment mechanism which adjusts the angle of a seat back pivotably mounted to a support frame, comprising:
- a master adjustment rod connected to one side of the seat back;
- a slave adjustment rod connected to an opposite side of the seat back;
- both said master rod and said slave rod translating in unison along their respective lengths as the seat back is pivoted relative to the support frame;
- a master locking mechanism supported on the frame and supporting said master adjustment rod;
- a slave locking mechanism supported on the frame and supporting said slave adjustment rod;
- both said master locking mechanism and said slave locking mechanism selectively operable in unison in a released state to permit a respective adjustment rod to translate relative thereto and in an engaged state to engage said respective rod at a first position along the respective length thereof corresponding to a selected angle of the seat back relative to the support frame;
- a memory mechanism operably associated with at least the master adjustment rod and selectively operable in a first state to disengage said master rod to permit translation of said master rod relative to said memory mechanism, and in a second state to engage said master adjustment rod at a second position corresponding to the selected angle of the seat back;

a recline mechanism connected to said master and slave locking mechanisms and to said memory mechanism, and having an activated position operable to place said master and slave locking mechanisms in said released state and said memory mechanism in said first state to permit adjustment of the first position of the master and slave locking mechanisms relative to said respective rod and adjustment of the second position of the memory mechanism relative to said master adjustment rod, and further having a deactivated position operable to place said master and slave locking mechanisms in said engaged state and said memory mechanism in said second state; and a dump mechanism connected to said master and slave locking mechanisms and operable only on said locking mechanisms to place said mechanisms in said adjustment state without changing the state of the memory mechanism.

19. A seat adjustment mechanism which adjusts the angle of a seat back pivotably mounted to a support frame, comprising:

a master adjustment rod connected to one side of the support back;

a slave adjustment rod connected to an opposite side of the support back;

both said master rod and said slave rod translating in unison along their respective lengths as the seat back is pivoted relative to the support frame;

a master locking mechanism supported on the frame and engageable about said master adjustment rod;

a slave locking mechanism supported on the frame and engageable about the slave adjustment rod;

both said master and said slave locking mechanisms having an input selectively operable to activate the locking mechanism to engage the respective rod at a position along the length thereof corresponding to the selected angle of the seat back relative to the support frame or to deactivate the mechanism to release said respective rod to permit said rod to translate relative to the mechanism;

a memory mechanism supported on the master adjustment rod and having a memory input to selectively activate said memory mechanism to engage said master adjustment rod at a position along the length thereof corresponding to the selected angle of the seat or to deactivate the mechanism to release said master adjustment rod to permit translation of said master rod relative to said memory mechanism;

a recline actuator having a manual input operable to simultaneously activate a first and a second recline output, said first recline output connected to said memory input;

a dump actuator having a manual input operable to activate a dump output;

a transfer mechanism having a first transfer input connected to said second recline output, a second transfer input connected to said dump output, a pair of transfer outputs simultaneously activated on activation of either said first or second transfer inputs, one each of said pair of transfer outputs connected to a corresponding input of said master and said slave locking mechanisms, wherein operation of said recline actuator input activates said first recline output to activate said memory input to deactivate said memory mechanism and activates said second recline output to activate said first transfer input, thereby activating said pair of transfer outputs to deactivate the corresponding input of said master and slave locking mechanisms, and further wherein operation of said dump actuator activates said dump output to activate said second transfer input, thereby activating said pair of transfer outputs to deactivate the corresponding input of said master and slave locking mechanisms.

20. The seat adjustment mechanism according to claim 18, wherein said transfer mechanism includes:

a housing; and a lever having a first end and an opposite second end and pivotably mounted to said housing between said first and second ends, wherein said first transfer input and one of said pair of transfer outputs is attached to said first end of said lever, and said second transfer input and the other of said pair of transfer outputs is attached to said second end of said lever.

21. The seat adjustment mechanism according to claim 20, wherein tension cables are used to connect said first transfer input to said second recline output, said second transfer input to said dump output and each of said pair of transfer outputs to said corresponding input of said master and said slave locking mechanisms.

22. The seat adjustment mechanism according to claim 20, wherein said transfer mechanism includes a stop selectively operable to prevent deactivation of said pair of transfer outputs.

23. The seat adjustment mechanism according to claim 22, wherein said transfer mechanism includes a reset mechanism operably connected between said memory mechanism and said stop, said reset mechanism operable to operate said stop only when said memory mechanism is engaged to said master adjustment rod and said rod is translated relative to said master locking mechanism.

24. The seat adjustment mechanism according to claim 23, wherein said reset mechanism includes a rack and pinion gear between said stop and said memory mechanism.

25. The seat adjustment mechanism according to claim 24, wherein:

said memory mechanism includes;

a memory marker selectively engageable about said adjustment rod; and a marker dock supported on the support frame and configured to support said memory marker when said memory mechanism is in said first state; and said reset mechanism includes;

said rack attached to said memory marker;

said pinion gear is mounted relative to said marker dock for rotation from a neutral position as said rack translates with said memory mechanism, said neutral position associated with said marker being in said marker dock; and a cable eccentrically mounted at one end to said pinion gear and at an opposite end to said stop.

26. The seat adjustment mechanism according to claim 22, wherein said stop includes a plunger slidably mounted within said housing and arranged to extend to a position interfering with the pivoting of said lever.

27. The seat adjustment mechanism according to claim 22, wherein said stop includes a stop lever pivotably mounted to said housing and arranged within said housing to pivot to a position interfering with the pivoting of said lever.

28. A seat adjustment mechanism which adjusts the angle of a seat back pivotably mounted to a support frame, comprising:

- an adjustment rod assembly connected to the support back, and movable with the seat back as the seat back is pivoted relative to the support frame;
- a locking mechanism supported on the frame and engageable to said rod assembly to prevent movement of said rod assembly relative to the frame, said locking mechanism having a normal configuration engaged to said rod assembly at a position corresponding to the selected angle of the seat back relative to the support frame and an activated configuration disengaged from said rod assembly to permit movement of said rod assembly relative to said mechanism;
- a memory mechanism operably associated with at least one rod of said adjustment rod assembly and having a normal configuration engaged to and movable with said rod assembly at a position thereof corresponding to the selected angle of the seat, and further having an activated configuration disengaged from said rod assembly to permit movement of said rod assembly relative to said memory mechanism;
- a recline control apparatus operably connected from a user input to said locking mechanism and to said memory mechanism, said user input having an activated state operable to place each of said locking mechanism and said memory mechanism in their respective activated configurations, whereby the angle of the seat back can be adjusted and the position of said memory mechanism relative to the rod assembly can be adjusted, and a released state operable to return said locking mechanism and said memory mechanism to their respective normal configurations, whereby the position of the memory mechanism relative to the rod assembly and the angle of the seat back is fixed; and
- a dump control apparatus operably connected from a dump input to said locking mechanism and not to said memory mechanism, said dump input having an activated state operable to place said locking mechanism in its activated configuration, whereby said rod assembly is movable to permit adjustment of the angle of the seat back.

* * * * *

UNITED STATES PATENT AND TRADEMARK OFFICE
CERTIFICATE OF CORRECTION

PATENT NO. : 6,315,361 B1
DATED : November 13, 2001
INVENTOR(S) : Stone et al.

It is certified that error appears in the above-identified patent and that said Letters Patent is hereby corrected as shown below:

Column 3,
Line 12, the word "in" should be capitalized;

Column 17,
Line 37, add -- 7 -- after the phrase "according to claim";

Column 20,
Line 12, delete "18" replace with -- 19 --.

Signed and Sealed this

Thirtieth Day of July, 2002

Attest:

Attesting Officer

JAMES E. ROGAN
Director of the United States Patent and Trademark Office